United States Patent [19]

Burkhard et al.

[11] Patent Number: 4,580,911

[45] Date of Patent: Apr. 8, 1986

[54] TILTING-SEGMENT RADIAL BEARING

[75] Inventors: Hans P. Burkhard, Turgi; Robert Odermatt, Dietlikon, both of Switzerland

[73] Assignee: BBC Brown, Boveri & Company, Limited, Baden, Switzerland

[21] Appl. No.: 721,361

[22] Filed: Apr. 9, 1985

[30] Foreign Application Priority Data

Jun. 22, 1984 [CH] Switzerland .......................... 3027/84

[51] Int. Cl.⁴ .............................................. F16C 17/03
[52] U.S. Cl. .................................................. 384/309
[58] Field of Search ............... 384/309, 117, 107, 310, 384/312, 311

[56] References Cited

U.S. PATENT DOCUMENTS

| | | | |
|---|---|---|---|
| 2,873,152 | 2/1959 | Thompson | 384/309 |
| 4,457,634 | 7/1984 | Vinciguerra | 384/309 |
| 4,490,054 | 12/1984 | Kimmelaar | 384/117 |
| 4,525,083 | 6/1985 | Pedersen | 384/309 |

Primary Examiner—Lenard A. Footland
Attorney, Agent, or Firm—Burns, Doane, Swecker & Mathis

[57] ABSTRACT

The inner boundary of a bearing ring has support strips which act as support surfaces for tilting segments secured by retaining studs. The support strips are parts of a cylindrical support surface and have originated by the remaining parts of the cylindrical support surface being cut away by cylindrical guide surfaces. The tilting segments are preferably annular cylindrical sectors.

3 Claims, 3 Drawing Figures

TILTING-SEGMENT RADIAL BEARING

BACKGROUND AND SUMMARY OF THE INVENTION

The present invention relates to a tilting-segment radial bearing.

Because of the very fast-running shaft journals, which reach peripheral speeds up to 100 meters/second, and because of their low loading by the relatively light rotor, problems occur in the smooth running and stability of the shaft axle especially in plain bearings of turbochargers for supercharging vehicle engines. Floating sleeve bearings are normally used nowadays for such applications, which floating sleeve bearings comprise two cylindrical sleeves pushed into one another. If such a bearing is properly designed, experience shows that it will have good floating and stability behaviour. As far as the design calculation is concerned, the difficulties are in determining the relative sleeve speed; as far as practical utility is concerned, the difficulty is ensuring a supply of oil to the inner lubricating gap.

Tilting-segment bearing are essentially simpler in operation principle and easier to design; however, the known designs of such bearings are more expensive to manufacture and assemble and, so far as is known, have therefore not been used hitherto for the purpose mentioned.

Because of the abovementioned advantages of tilting-segment bearings in general, and in the form of tilting-segment radial bearings in particular, for mounting turbocharger rotors and such like, the invention originated from the object of developing a design of tilting-segment radial bearing which is advantageous for construction, simple and inexpensive manufacture and ease of assembly. The object is also to enable economical application of such bearings of smaller dimensions where simple sleeve bearings were used previously for reasons of cost.

BRIEF DESCRIPTION OF THE DRAWINGS

The invention is described in greater detail as follows with reference to an illustrative embodiment of an actual bearing shown in the drawing, wherein.

DETAILED DESCRIPTION OF THE PREFERRED EMBODIMENTS

Figure 1:
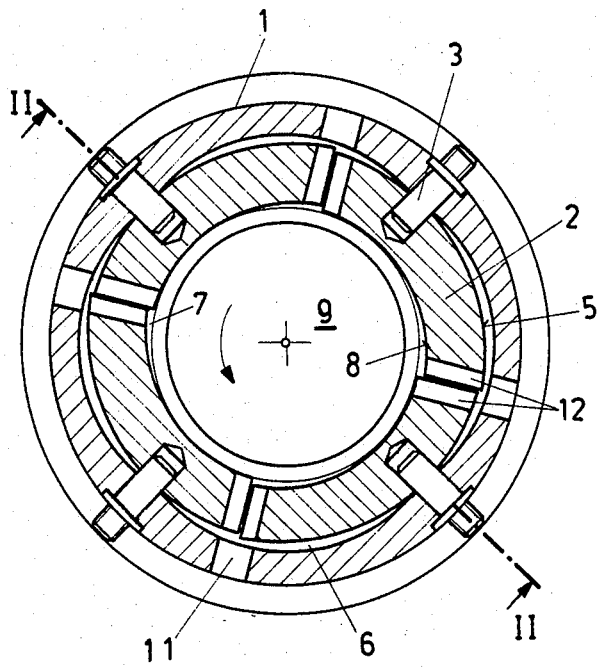
FIG. 1 shows a cross-section through a bearing along section I—I in FIG. 2.
Figure 2:
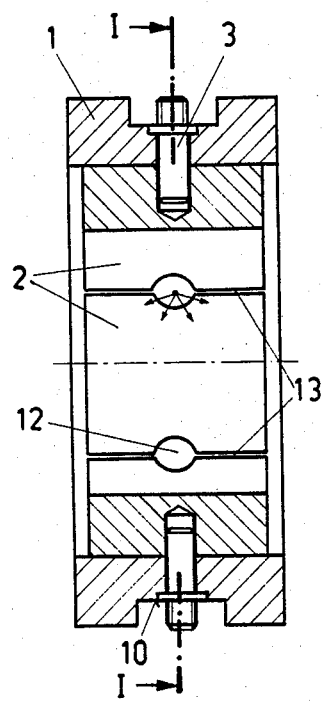
FIG. 2 shows an axial section through the bearing along section II—II of FIG. 1.

The bearing shown in FIGS. 1 and 2 has as main parts a closed, one-piece bearing ring 1, four tilting segments 2 located inside this bearing ring 1 and four retaining studs 3. The retaining studs have a clearance fit in the fitting segments, so that free tilting movement of the latter is ensured. They also ensure that the tilting segments are not displaced in the axial and peripheral directions. Each of the tilting segments 2 is supported inside the bearing ring 1 on a short support strip 4 of a cylindrical support surface S of radius r. This radius r as well as the width b of the support strip 4 follows from FIG. 3, which shows the geometric characteristics of the bearing ring 1. The strips 4 are made by drilling out four cylindrical guide surfaces F of radius $r_f$ from the cylindrical support surfaces F of radius r. The geometric axes $M_F$ of the guide surfaces S are offset by the eccentricity e relative to the geometric axis $M_L$ of the cylindrical support surface S.

The tilting segments 2 can be made from a single circular cylindrical ring. The width of the sectional seam produced when the ring is split by sawing or milling results in the clearance between the ends of two adjacent tilting segments in the peripheral direction, which clearance is required for the free tilting movement of the tilting segments.

The guide surfaces F and the rear sides 5 of the tilting segments define trap gaps 6 which are filled with oil during operation and thus provide for damping and, in interaction with the lubricating gaps 7 forming during operation between the running surfaces 8 of the tilting segments and a shaft journal 9, also provide for stabilising the position of the tilting segments and therefore also the position of the shaft journal.

The oil is fed into the lubricating gaps from a bearing housing (not shown) via an annular oil channel 10 on the outer periphery of the bearing ring 1 and via radially aligned oil feed holes 11 and 12 in the bearing ring 1 or on each end face of two adjacent tilting segments. The gaps existing between these end faces act as scavenging ports 13 for conducting away the oil which is driven out of the lubricating gaps by the fresh oil under pressure. As usual, the radius of the segment running surfaces is greater than the shaft journal surface, so that the curvature clearance of the segments is greater than the contact clearance.

Figure 3:
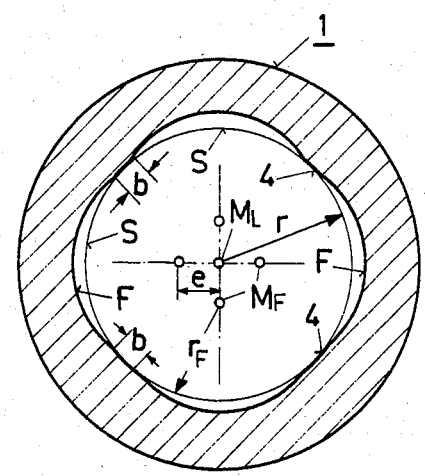
FIG. 3 shows a basic form of an element of the bearing in order to explain the geometric relationships.

Apart from the dissection of the ring, from which operation the tilting segments originate, the bearing can be made very efficiently by simple turning and drilling operations. A further simplification results if seamlessly drawn, precision steel pipe is used as the raw material for the bearing ring 1. In mass production, manufacture becomes even more economical if sectional steel pipe having the profile of the finished bearing ring 1 as shown in FIG. 3 is used.

The invention has been described here with reference to an illustrative embodiment having four tilting segments. Of the course, the advantages of this bearing also apply, however, to embodiments having three or more than four tilting segments. Because of the smallness of the bearing and the low loads which occur in this size of bearing, embodiments having only three or four tilting segments are in practical terms sufficient for the abovementioned applications.

For difficult installation conditions, the bearing ring can also be designed in several pieces, preferably in two pieces, with the parting lines to be positioned in the area of the guide surfaces F.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A tilting-segment radial bearing, having a bearing ring and a plurality of segments arranged in such a way that they can be tilted inside the bearing ring and have a cylindrical bearing running surface and cylindrical outer surface and including retaining studs for fixing the tilting segments in axial and peripheral directions of the bearing and also having feed and discharge channels for lubricating oil, the improvement comprising the bore of the bearing ring having cylindrical surfaces wherein:

I. support strips, the number of which is equal to the number of tilting segments which function as support and roll-off surfaces for the tilting segments, the support strips forming parts of a circular cylindrical support surface coaxial to the geometric axis of the bearing ring, a width of the support strips, in the peripheral direction, less than the diameter of the retaining studs, and II. a number of cylindrical guide surfaces corresponding to the number of tilting segments, the guide surfaces extending between the support strips and having a curvature which, on average, is larger than the cylindrical support surface and wherein the cylindrical rear sides of the tilting segments have a smaller curvature than the guide surfaces so that the cylindrical rear sides of the tilting segments and the guide surfaces define trap gaps.

2. A tilting-segment radial bearing according to claim 1, wherein the guide surfaces are parts of circular cylindrical surfaces, the axes of which are offset by an eccentricity relative to the axis of the cylindrical support surface and the tilting segments are sectors of annular cylinders with the bearing ring is designed in one piece.

3. A tilting-segment radial bearing according to claim 1, wherein the bearing ring is of split design.

* * * * *